United States Patent [19]

Minerd

[11] 4,197,560
[45] Apr. 8, 1980

[54] EXPOSURE CONTROL FOR SELECTIVE SPEED XEROGRAPHIC PRINTING AND THE LIKE

[75] Inventor: Timothy M. Minerd, Richardson, Tex.

[73] Assignee: Xerox Corporation, Stamford, Conn.

[21] Appl. No.: 672,706

[22] Filed: Apr. 1, 1976

[51] Int. Cl.² ................. H04N 1/22; H04N 1/40; H04N 5/80

[52] U.S. Cl. .................. 358/300; 346/76 L; 346/160; 358/127; 358/302

[58] Field of Search .............. 358/127, 286, 300, 302, 358/280, 130; 355/14; 346/76 L, 108, 160, 109, 153; 179/100.3 N

[56] References Cited

U.S. PATENT DOCUMENTS

| 2,274,530 | 2/1942 | Collins | 179/100.3 N |
|---|---|---|---|
| 3,105,426 | 10/1963 | Bickmore et al. | 346/153 |
| 3,245,083 | 4/1966 | Wilson et al. | 346/109 |
| 3,316,348 | 4/1967 | Hufnagel et al. | 358/286 |
| 3,354,465 | 11/1967 | Merritt et al. | 346/109 |
| 3,482,254 | 12/1969 | Harrison et al. | 346/76 L |
| 3,750,189 | 7/1973 | Fleischer | 346/160 |
| 3,858,004 | 12/1974 | Mason et al. | 358/300 |

FOREIGN PATENT DOCUMENTS 284285  2/1929  United Kingdom .............. 179/100.3 N Primary Examiner—Raymond F. Cardillo, Jr.

[57] ABSTRACT

A selective speed xerographic processor having a laser for exposing a photoreceptor at any one of a plurality of different printing rates in response to a video signal is characterized by including an adjustable optical attenuator and an adjustable electrical attenuator for coarsely and more precisely, respectively, normalizing the exposure process. The processor may be used to advantage as a printer for a facsimile systems offering a choice of several different document transmission times.

9 Claims, 3 Drawing Figures

EXPOSURE CONTROL FOR SELECTIVE SPEED XEROGRAPHIC PRINTING AND THE LIKE

BACKGROUND OF THE INVENTION

This invention relates to laser printing and, more particularly, to analog exposure control for selective speed xerographic printing.

Selective speed xerography was recently commercially introduced as a feature of the Telecopier 200 facsimile transceiver, which is manufactured and sold by Xerox Corporation. Those units provide an operator with the option of selecting a nominal transmission time of approximately two, three, four or six minutes for a standard 8½"×11" document. Furthermore, they rely on analog video signalling to convey the information content of a subject copy from a transmitting terminal to a receiving terminal at a rate consistent with the document transmission time selected.

When the Telecopier 200 transceiver is operating in its receive or print mode, a low power HeNe laser selectively discharges a more or less uniformly charged photoreceptor in response to the incoming video signal, thereby forming a latent electrostatic image of the subject copy. Generally standard techniques are then employed to develop or tone the latent image and to transfer and fuse the developed image onto a plain paper substrate.

One of the hurdles which had to be overcome to accommodate the different document transmission times is that the xerographic process is exposure time sensitive—viz, the shading of a xerographically produced image varies as a direct function of the exposure time, if all other parameters are held constant. The initial solution to that problem, which is disclosed and claimed in the commonly assigned Mason et al. U.S. Pat. No. 3,858,004 which issued Dec. 31, 1974, on a "Filter for Selective Speed Xerographic Printing in Facsimile Transceivers and the Like," involved precision optical attenuation of the laser beam to hold the radiant energy incident on the photoreceptor within a predetermined range of power per unit area, regardless of the document transmission time selected. Thus, several neutral density optical filters, each precisely matched to a different one of the document transmission times, were called for so that a filter providing the appropriate degree of optical attenuation for the document transmission time selected could be interposed between the laser and photoreceptor in preparation for carrying out the printing process.

That has proven to be reasonably effective solution to the problem, but experience has shown that it suffers from at least a couple of shortcomings. First, the precision required of the filters dictates the use of complex and sophisticated stacks of optical elements, which means that the filters are expensive and also liable, unless great care is taken, to introduce undesirable optical distortions. Secondly, the filters do not permit of the power per unit photoreceptor area for the different document transmission times being easily adjusted in the field, which means that fine tuning of the transceiver to the actual operating environment is inordinately difficult, if possible at all.

SUMMARY OF THE INVENTION

Accordingly, an object of this invention is to provide methods and means for electronically supplementing, if not replacing, the optical attenuation used in selective speed xerographic processors to accommodate different printing rates. A more detailed, related object is to provide method and means for electronically fine tuning a selective speed xerographic processor to the actual operating environment. In other words, an object is to provide methods and means for increasing the allowable tolerances for the optical filters employed in selective speed xerographic processors.

Indeed, another object of the present invention is to provide methods and means for facilitating selective speed laser printing on exposure time sensitive recording mediums in general, without limitation to xerographic photoreceptors.

A somewhat more specific object of this invention is to provide methods and means for improving the performance of facsimile terminals which rely on laser printing and xerographic processing to generate a facsimile copy at anyone of a plurality of different rates.

Briefly, to carry out these other objects of this invention, a printer having a photoresponsive, exposure time sensitive recording medium comprises an internally modulated laser for selectively exposing the recording medium in an image configuration in response to an information bearing drive current which has its amplitude automatically adjusted to effectively maintain a predetermined exposure contrast at anyone of a plurality of different print rates. In keeping with certain of the more specific objects of the invention, the illustrated printer is a selective speed xerographic processor for printing facsimile copies at a receiving terminal of a facsimile system offering a plurality of different document transmission times. Widely divergent document transmission times or printing rates are readily and economically accommodated by employing a synergistic combination of optical attenuation of the light beam emitted by the laser for coarse exposure control and electronic amplitude adjustment of the drive current applied to the laser for fine exposure control.

BRIEF DESCRIPTION OF THE DRAWINGS

Still further objects and advantages of the invention will become apparent when the following detailed description is read is conjunction with the attached drawings, in which.

DETAILED DESCRIPTION OF THE ILLUSTRATED EMBODIMENT

While the invention is described in some detail hereinbelow with specific reference to a single illustrated embodiment, it is to be understood that there is no intent to limit it to that embodiment. On the contrary, the aim is to cover all modifications, alternatives and equivalents falling within the spirit and scope of the invention as defined by the appended claims.

Figure 1:
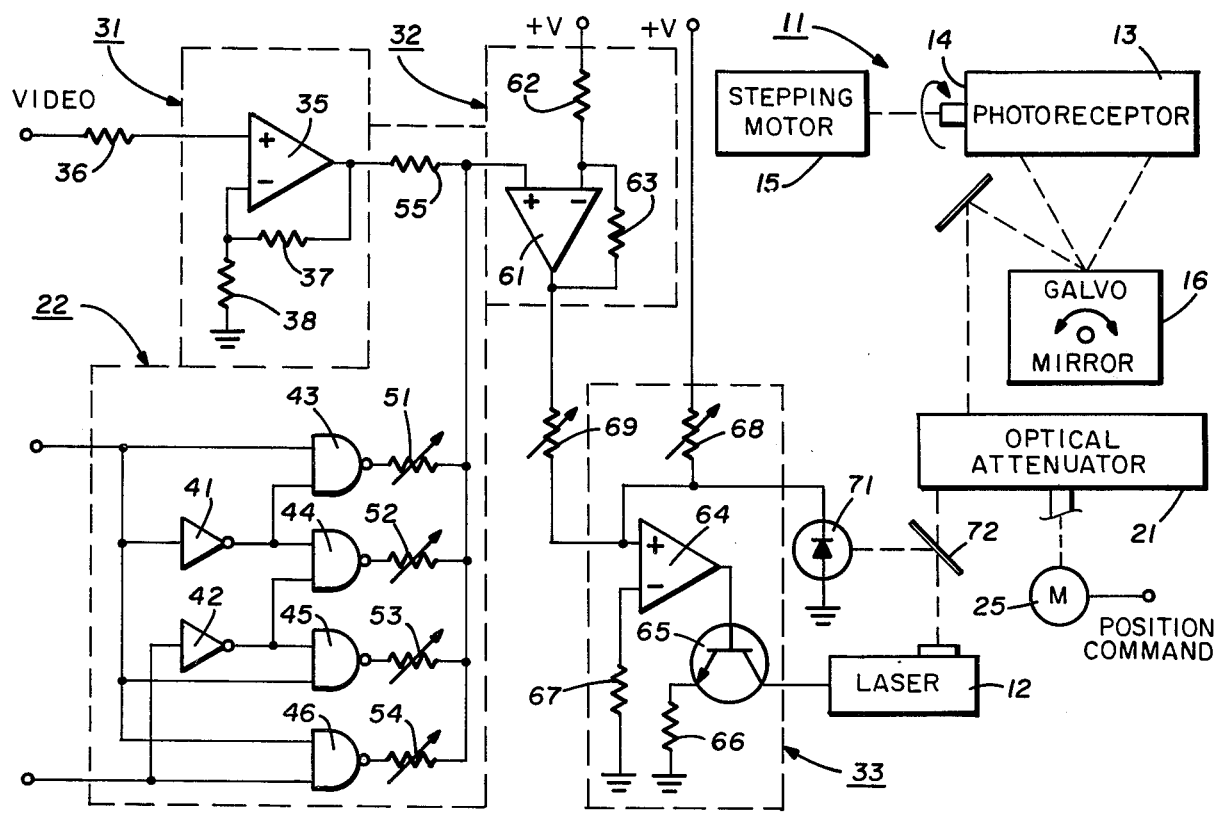
FIG. 1 is a simplified diagram of a selective speed xerographic processor including an internally modulated laser having an exposure control circuit embodying the present invention.

Turning now to the drawings, and at this point especially to FIG. 1, there is a xerographic processor 11 (shown only in relevant part) comprising an internally modulated laser 12 which is driven by a video signal to selectively expose a photoreceptor 13 in an image configuration. A more or less uniform charge is initially imparted to the photoreceptor 13 (by means not shown), and the laser 12 emits a coherent and substantially collimated, video modulated, light beam to dissipate the charge in selected areas, thereby forming a latent electrostatic image. In the ordinary course, that image is then developed, and the developed image is thereafter transferred to and fused on a suitable substrate, such as plain paper.

As illustrated, the photoreceptor 13 is a surface coating on an electrically conductive drum 14 which is incrementally rotated by a stepping motor 15. Moreover, there is a galvanometer mounted mirror 16 optically interposed between the output of the laser 12 and the photoreceptor 13 for cyclically sweeping the laser light beam axially of the drum 14. Hence, a raster-like printing pattern is easily obtained by timing the stepping motor 15 so that the drum 14 is incremented as the galvanometer mounted mirror 16 retraces.

It follows that the processor 11 is especially well suited to serve as a printer for a facsimile receiver or transceiver. As is known, facsimile communications are classically carried out by scanning a subject copy at transmitting terminal (not shown) in accordance with a predetermined raster pattern, thereby serially converting the information content of the subject copy into a video signal. That signal is, in turn, transmitted to a receiving terminal where there is a printer for printing a facsimile of the subject copy in response to the video signal. Normally, the aim is to carry out the scanning and printing processes in accordance with essentially identical raster patterns so that the facsimile copy conforms to the subject copy in size and overall composition. Different document transmission times (such as the two, three, four and six minute rates of the Xerox Telecopier 200 transceiver) can be realized by changing the rate at which the scanning process is advanced along the X-axis and/or the Y-axis of the raster. However, changes of that type call for corresponding changes in the rate at which the printing process is advanced if the aforementioned conformity is to be obtained. Thus, as schematically depicted, provision is made for adjusting the rate at which the drum 14 is advanced by the stepping motor 15 and for adjusting the rate at which the laser beam is swept by the galvanometer mounted mirror 16.

There is no reason to burden this disclosure with a detailed description of the means provided for changing the rate at which the printing takes place. Indeed, anyone interested in the specific provision made for that purpose in an exemplary environment for this invention may refer to the commercially available Telecopier 200 equipment and to the published literature pertaining thereto, including commonly assigned Mason et al. and Perrault et al. U.S. Pat. Nos. 3,869,569 and 3,889,057, respectively, which are hereby incorporated by reference.

Implicit in the application of processor 11 to the printing requirements of the Telecopier 200 transceiver or, for that matter, any other device calling for a variable printing rate, is what is conveniently referred to as "selective speed xerography." As is known, most any photoreceptor is exposure time sensitive—viz, the shading of a xerographically produced image varies as a direct function of the exposure time per unit area of the photoreceptor, if all other parameters are held constant. Accordingly, selective speed xerography requires that the exposure process be normalized so that the radiant energy imparted to the photoreceptor is held within a predetermined range, regardless of the printing rate (or, in a facsimile setting the document transmission time) selected.

In accordance with the present invention, the processor 11 includes an adjustable optical attenuator 21 for making any coarse adjustments necessary to normalize the exposure process and an adjustable electrical attenuator 22 for making the finer or more preceise adjustments. The optical attenuator 21 is on the output side of the laser 12 in position to control the intensity of the video modulated light beam incident on the photoreceptor 13. On the other hand, the electrical attenuator 22 is in the video input circuit for the laser 12 to control the level of the video drive signal. That is a synergistic combination inasmuch as a wide range of different printing rates or document transmission times can be accommodated while using relatively simple optics and maintaining a reasonably high modulation factor for the laser.

Nevertheless, in passing, it should be noted that the laser modulation factor (i.e., the ratio of one-half the difference between the maximum and minimum output power levels of the laser to its average output power level) largely determines the contrast range available for the xerographically produced images. Thus, it will be understood that the optical attenuation may be omitted, without departing from this invention, if a satisfactory contrast range can be maintained at all printing rates while relying entirely on electrical attenuation of the video drive signal applied to the laser 12 for normalizing the exposure process. However, that is expected to be no more than exception to the general rule.

Figure 2:
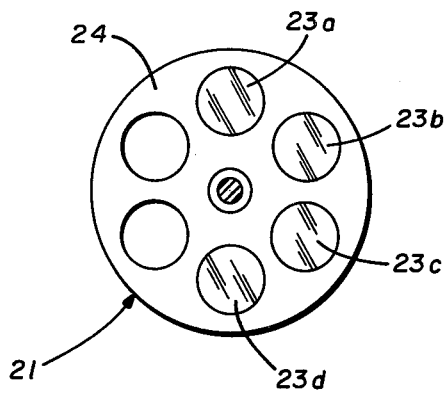
FIG. 2 is an elevational view of a suitable optical attenuator for the processor shown in FIG. 1.

More particularly, as illustrated, the optical attenuator 21 comprises a plurality of neutral density filters 23a–23d (FIG. 2) which are supported in suitable frame-like holders at circumferentially spaced apart intervals on a wheel 24. The filters 23a–23d characteristically have different transmissivities and are pre-assigned to, say, different ones of the printing rates expected of the processor 11. Furthermore, there is a motor 25 for rotatably indexing the wheel 24 in response to the selection or identification of a desired printing rate, whereby the filter 23a, 23b, 23c, or 23d for the selected printing rate is then moved into optical alignment between the output of the laser 12 and the photoreceptor 13.

An optical attenuator of the same general configuration is shown and described in even greater detail in the aforementioned Mason et al, U.S. Pat. No. 3,858,004, which is hereby incorporated by reference. However, the additional control provided, in keeping with this invention, by the electrical attenuator 22 significantly relaxes the requirements imposed on the filters 23a–23d. Specifically, the filters 23a–23d still desirably are relatively distortion free. Nevertheless, increased simplicity and reduced expense may be realized because the transmissivities of the filters 23a–23d need only be approximately matched to the printing rates to which they are assigned. That is, the function of the filters 23a–23d is to attenuate the light beam emitted by the laser 12 while the processor 11 is operating at different ones of its printing rates so that the radiant energy imparted to the photoreceptor 13 is simply maintained within reach of a predetermined, "normalized" range. As a matter of definition, the "within reach" standard means that the electrical attenuator 22 may carry out any additional adjustments necessary to bring the radiant energy imparted to the photoreceptor 13 squarely within the normalized range while still maintaining a reasonably high modulation factor for the laser 12. In short, the optical attenuator 21 is merely relied on to coarsely normalize the exposure process.

It is, perhaps, worth mentioning that the modulation factor for the laser 12 can be objectively measured by comparing a electrometer-type voltage level reading taken from one area of the photoreceptor 13 which has been exposed while the laser 12 is modulated "full on" against a similar voltage level reading taken from another area of the photoreceptor 13 which has been exposed while the laser 12 is modulated "full off." A satisfactorily high modulation factor is provided for the laser 12 if the voltage difference between those readings is more or less the same as a predetermined voltage difference required between background and image areas of the photoreceptor 13 to obtain xerographic prints exhibiting adequate contrast.

Here, there is a positive going video input signal for modulating the light beam emitted by the laser 12. For that reason, the video drive circuit for the laser 12 advantageously includes a buffer stage 31, the electrical attenuator 22, a level shifting circuit 32, and a driver stage 33. Basically, the electrical attenuator 22 is a variable voltage divider which is automatically adjusted in response to the selection or identification of a desired printing rate for the processor 11 to make any fine adjustments necessary to normalize the exposure process.

In more detail, for isolating the video input from the electrical attenuator 22, the buffer stage 31 comprises an operational amplifier 35 which is operated in a non-inverting, linear mode. An input resistor 36 applies the video signal to the non-inverting input of the operational amplifier 35. Moreover, to obtain a more or less linear transfer function, the operational amplifier 35 has its output returned to its non-inverting input by a feedback resistor 37 and its non-inverting input returned to ground by a self biasing resistor 38.

From the buffer stage 31, the video signal is fed to the electrical attenuator 22 which, as previously mentioned, essentially is a variable voltage divider. In accordance with the present invention, the voltage dividing ratio of the attenuator 22 is adjusted as a function of the printing rate selected for the processor 11, whereby the swing of the video drive signal applied to the laser 12 is controlled to bring the exposure process squarely within the aforementioned normalized range.

As shown, to carry out this invention, the electrical attenuator 22 includes a NAND gate-type decoder 41-46 for selectively switching one or the other of a plurality of resistors 51-54 in shunt with a fixed resistor 55 which, in turn, is connected in series with the output of the buffer stage 31. In this instance, a pair of control bits are applied (by means not shown) to the input of the decoder 41-46, thereby providing four (4) distinct combinations of logic levels (i.e., 00, 01, 10, and 11) for uniquely identifying different printing rates for the processor 11. Of course, if a greater number of printing rates are involved, the decoder 41-46 may be expanded to select from a larger group of shunt resistors under the control of an increased number of control bits.

Each of the shunt resistors 51-54 is dedicated to a different one of the printing rates for the processor as a result of the selective switching provided by the decoder 41-46. That means that the attenuator 22 may be easily programmed to provide the appropriate voltage dividing ratios for normalizing the exposure process at the different printing rates of the processor 11 by independently selecting the values of the shunt resistors 51-54 relative to the value of the series resistor 55 on a printing rate-by-printing rate basis. Indeed, the shunt resistors 51-54 preferably are adjustable so that the programming of the attenuator 22 may be carried out through the use of a straightforward set-up procedure. Specifically, a suitable set-up procedure involves serially operating the processor 11 at its several printing rates while applying a peak amplitude video test signal to the buffer stage 31, whereby the values of the shunt resistors 51-54 may be sequentially adjusted while taking electrometer readings from exposed or discharged areas of the photoreceptor 13 to determine the shunt resistance required to normalize the exposure process at each of the printing rates.

The attenuated video signal provided by the attenuator 22 is applied to a level shifting circuit 32 which is configured to carry out a voltage-to-current conversion process. For that purpose, the level shifting circuit 32 comprises an operational amplifier 61 which has its output returned through a feedback resistor 63 to its inverting input which, in turn, is tied to a positive supply source by a bias resistor 62. The voltage level of the supply source is selected so that the operational amplifier 61 provides a negative d.c. output voltage which is proportional to the attenuated video signal.

Figure 3:
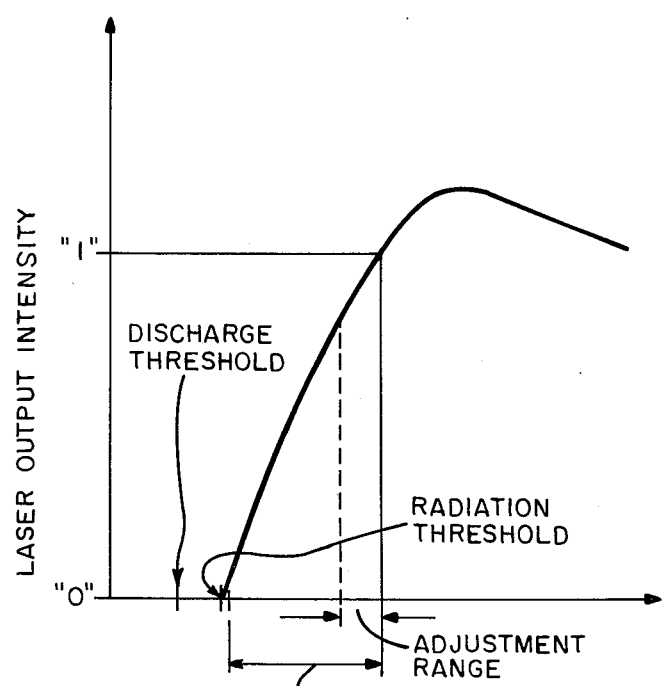
FIG. 3 is a typical input current versus output power curve for the laser shown in FIG. 1.

For regulating the current drawn by the laser 12, the final or output stage 33 of the video drive circuit comprises an operational amplifier 64 and a transistor 65. As will be appreciated, the transistor 65 is a more or less conventional series current regulator inasmuch as its collector is connected to the cathode of the laser 12 and its emitter is returned to ground through a self biasing resistor 66. The function of the operational amplifier 64 is, in turn, to modulate the base-emitter control current for the transistor 65 and, therefore, the intensity of the light beam emitted by the laser 12 (FIG. 3) in accordance with the attenuated video signal appearing at the output of the attenuator 22.

To perform that function, the operational amplifier 64 has its output coupled to the base of the transistor 65, its inverting input returned to ground through a resistor 67, and its non-inverting input acting as a current summing node. That is, the non-inverting input of the operational amplifier 64 algebraically combines a positive reference current drawn from a suitable supply source by a variable resistor 68 with a negative video current drawn from the output of the level shifting circuit 32 by another variable resistor 69. The values of the resistors 68 and 69 are adjusted under quiescent conditions (i.e., when the video input signal is at zero volts) to maximize the negative current drawn through the resistor 69 and to hold the anode-cathode current drawn by the laser 12 just slightly above the level at which output radiation is first observed (conveniently referred to as the "threshold of radiation" to distinguish the lower "discharge threshold") so that the output of the laser 12 is reasonably well stabilized. Consequently, a positive going video input signal results in a positive going (decreasing negative current) input current for the laser 12. Under those conditions, as will be best understood upon referring to FIG. 3, the intensity of the laser light beam varies in accordance with the video input signal within bounds determined by the voltage dividing ratio of the attenuator 22. In other words, the upper end of the "operating range" for the laser 12 is expanded or contracted within a so-called "adjustment range" under the control of the attenuator 22. Consequently, the attenuator 22 provides the control necessary to bring the exposure process squarely within the normalized range.

Experience has demonstrated that the output of the laser 12 may tend to drift under the influence of various factors, including ambient temperature variations, aging and the like. To counteract that, there desirably is a photoelectric negative feedback circuit for stabilizing the laser 12. For example, here, a photodiode 71, which is connected in a ground return path for the non-inverting input of the operational amplifier 64 to serve as a current sink, is radiated by a laser light sample which is diverted from the primary optical path by a beam splitter 72 which, in turn, is optically aligned between the output of the laser 12 and the optical attenuator 21. As will be appreciated, a relatively small sample or part of the total laser output power provides sufficient radiation to cause the conductivity of the photodiode 71 to vary as a direct function of the intensity of the light beam, thereby stabilizing the laser 12.

CONCLUSION

In view of the foregoing, it will now be evident that the present invention provides improved methods and means for normalizing the exposure process when selective speed laser printing is carried out using an exposure time sensitive recording medium, such as a xerographic photoreceptor. While the emphasis has been directed toward a facsimile environment, it will be understood that the invention also applies to local copying or printing.

What is claimed is:

1. In a selective speed printer for printing an image on a photoresponsive, exposure time sensitive recording medium at any selected one of a plurality of different printing rates in response to a video input signal; said printer including
   a laser for emitting a beam of radiant energy,
   circuit means coupled to said laser for modulating said beam in response to said video signal,
   means for exposing said recording medium to the modulated beam in accordance with a predetermined pattern and at said selected printing rate;
   an adjustable optical attenuator positioned between said laser and said recording medium to subject said modulated beam to any one of a plurality of different degrees of optical attenuation, and
   means for adjusting said optical attenuator as a function of the printing rate selected, whereby the optical attenuation provided thereby at least coarsely normalizes the radiant energy imparted to said recording medium; the improvement comprising
   adjustable attenuator means within said circuit means for attenuating said video signal, and
   means for adjusting said attenuator means as a function of the printing rate selected, whereby the radiant energy imparted to said recording medium is held within a predetermined, normalized range.

2. The improvement of claim 1 wherein
   said attenuator means is a variable voltage divider programmed to provide any one of a plurality of different voltage dividing ratios, and
   said means for adjusting said attenuator means includes means for selecting the voltage dividing ratio for said voltage divider as a function of the printing rate selected.

3. The improvement of claim 2 wherein
   said voltage divider includes a series resistance and a plurality of additional resistances, each of said additional resistances being dedicated to a different one of said printing rates; and
   said selecting means includes means for selectively switching the additional resistance dedicated to the selected printing rate into shunt with said series resistance, thereby determining the voltage dividing ratio for said divider.

4. The improvement of claim 1 wherein said recording medium is a xerographic photoreceptor.

5. The improvement of claim 4 wherein
   said attenuator means is a variable voltage divider capable of providing any one of a plurality of different voltage dividing ratios, and
   said attenuator adjusting means includes means for selecting the voltage dividing ratio for said voltage divider as a function of the printing rate selected.

6. A printer for a facsimile system offering a choice of several different document transmission times, said printer comprising the combination of
   a xerographic photoreceptor,
   a laser for emitting a beam of radiant energy,
   means for exposing said photoreceptor to said beam in accordance with a predetermined pattern and at a rate corresponding to any selected one of said document transmission times,
   optical means positioned between said laser and said photoreceptor for adjustably attenuating said beam as a function of the document transmission time selected, thereby at least coarsely normalizing the radiant energy imparted to said photoreceptor, and
   means coupled to said laser for modulating said beam in accordance with a video signal representing the information content of a subject copy, said modulating means including an electrical attenuator for adjustably attenuating said video signal as a function of the document transmission time selected, thereby holding the radiant energy imparted to said photoreceptor within a predetermined, normalized range.

7. The printer of claim 6 wherein said electrical attenuator comprises
   a variable voltage divider programmed to provide any one of a plurality of different voltage dividing ratios each dedicated to a different one of said document transmission times, and
   means for selecting the voltage dividing ratio for said divider as a function of the document transmission time selected.

8. The printer of claim 7 wherein
   said voltage divider comprises a series resistance and a plurality of substantially independent, normally open circuited, shunt resistances each dedicated to a different one of said document transmission times; and
   said selecting means includes means for switching the shunt resistance dedicated to the selected document transmission time into shunt with said series resistance, thereby determining the voltage dividing ratio for said divider.

9. The printer of claim 8 wherein said shunt resistances are variable, whereby the voltage dividing ratios offered by said divider may be tailored in situ to the different document transmission times.

* * * * *